May 30, 1944.   L. O. REICHELT   2,349,882
MULTIPLE UNIT APPARATUS
Filed May 23, 1942    2 Sheets-Sheet 1
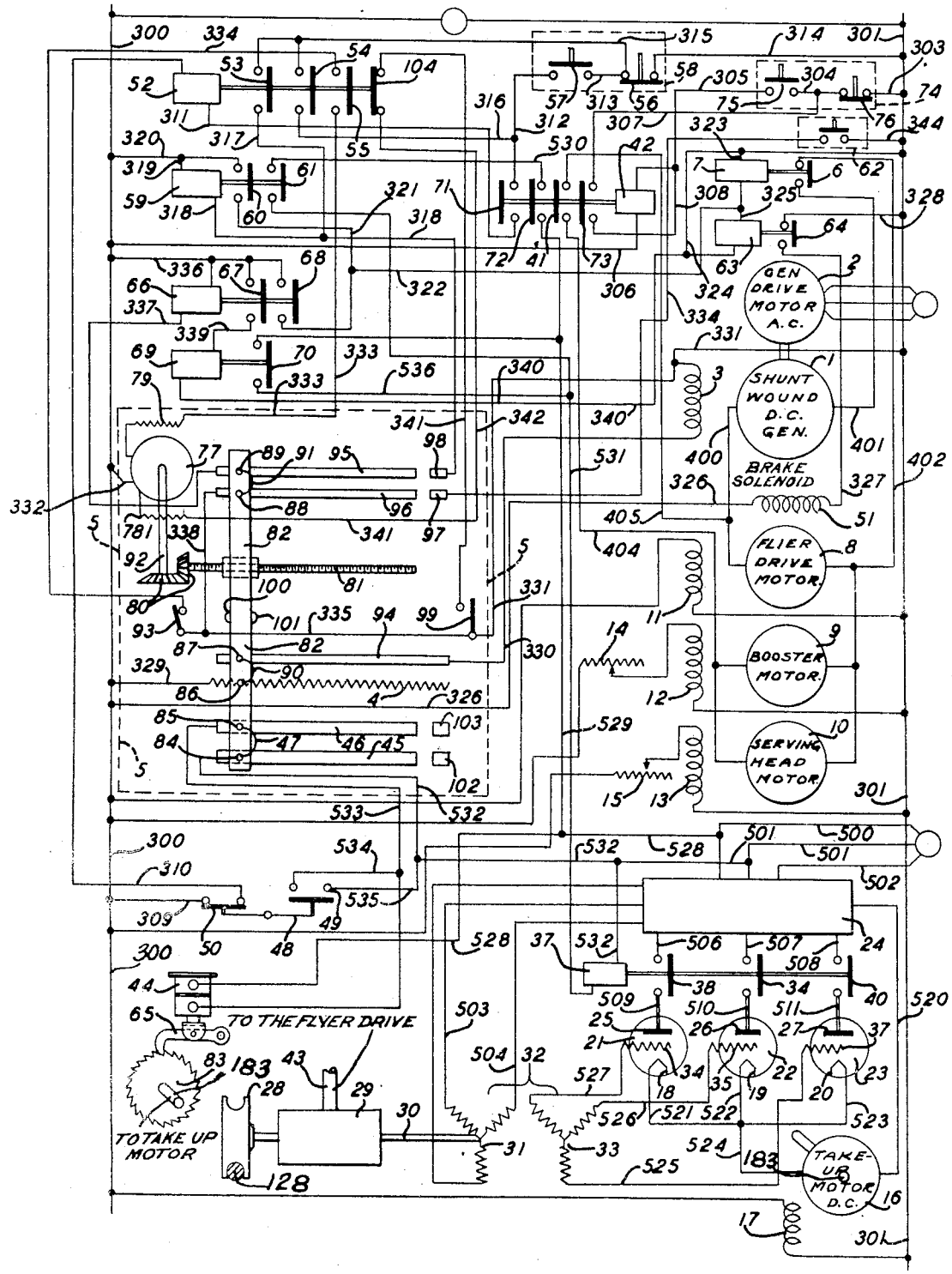
INVENTOR
L.O. REICHELT
BY
E.R. Nowlan
ATTORNEY

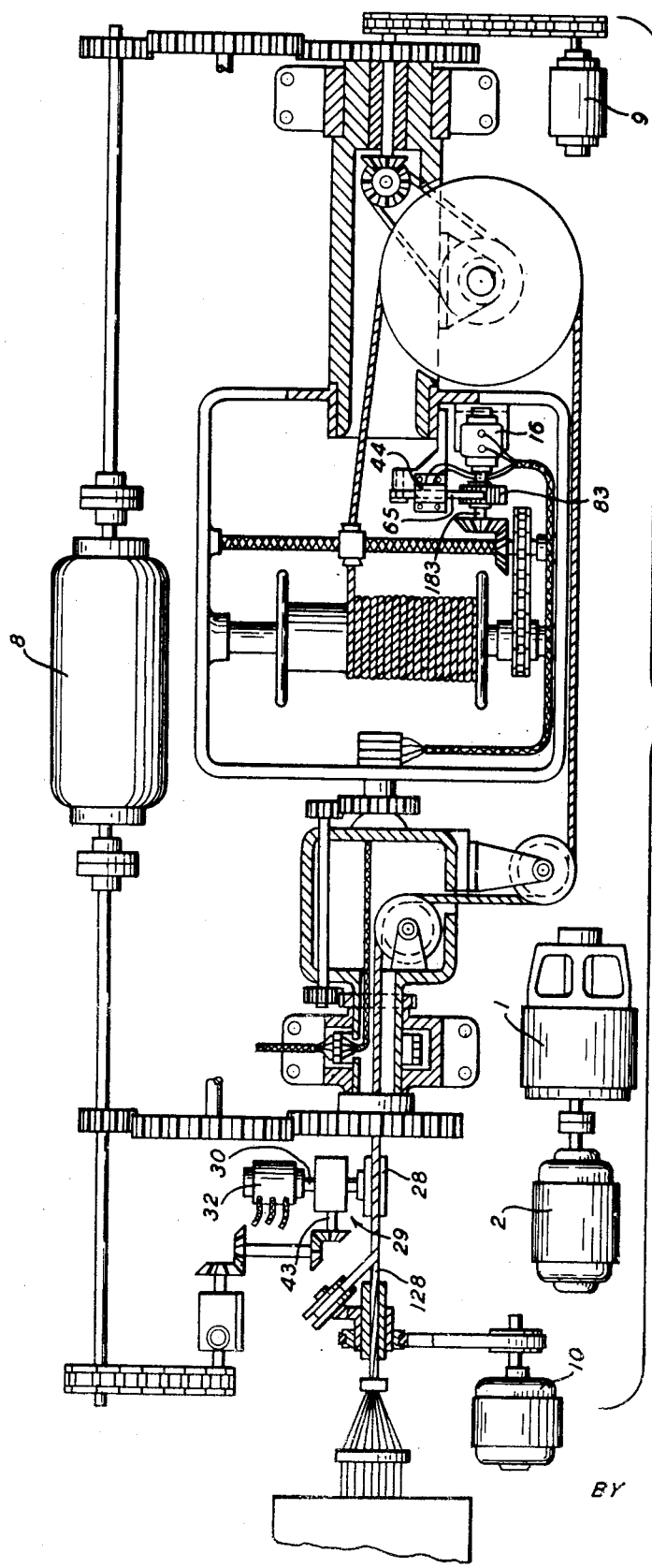

Patented May 30, 1944

2,349,882

UNITED STATES PATENT OFFICE 2,349,882

MULTIPLE UNIT APPARATUS

Lester O. Reichelt, Cranford, N. J., assignor to Western Electric Company, Incorporated, New York, N. Y., a corporation of New York Application May 23, 1942, Serial No. 444,285

6 Claims. (Cl. 57—100)

This invention relates to multiple unit apparatus, and more particularly to apparatus for combining strands into multiconductor electric cables or cores for such cables.

The manufacture of cables or cable cores consists essentially in simultaneously longitudinally advancing a plurality of suitable strands and rotating the plurality about an axis in the line of advance to intertwist the strands together. To do this, one usual method is to mount a plurality of supplies of strand, e. g. spools, reels or the like, in a rotatable support which is rotated at constant speed while the strands are drawn off together in the direction of the axis of rotation through a stationary compacting die, and the cable or core thus formed is then taken up on a reel, spool or the like whose axis of rotation is stationary and at right angles to the advance of the cable. Another method is to hold the plurality of supply reels stationary in position and cause the axis of the take-up reel to rotate on the line of advance of the cable. In either cases there are two principal motions involved, the linear longitudinal advance of the plurality of strands, and the rotation of the plurality about the line of longitudinal advance which effects the intertwisting together of the strands, the latter motion being effected in the one case by the rotation of the strand supplies and in the other case by the rotation of the strand take up. A third method consists in providing a rotating flier to effect the rotation of the group of strands, the flier being positioned to rotate about either the group of strand supplies or the take-up means. In whichever way the cabling is done, the apparatus to do it will include an element rotating about an axis parallel to and usually coincident with the line of advance of the combined or cabled strands, and an element rotating about an axis at right angles to the advancing cable. The former of these two elements performs the function of intertwisting the strands together and the latter the function of advancing the cabled strands or of winding the cable up for storage or both. The former element may be a rotarily driven cage in which strand supply reels are mounted, or it may be a flier rotating about a stationary group of such reels, or about a take-up reel, or it may be a rotarily driven frame in which a cable advancing means or storage means or both are mounted to rotate with the frame. The latter element, the one effecting the longitudinal advance of the strands and cable, may be a capstan operating independently or in connection with a take-up reel, or it may be a simple reel which is driven both to advance and take up the cable. In any event the angular twist per unit length, or lay, of the cable is governed by the ratio of the rotary speed of the twisting element about the axis of the cable to the rotary speed of the cable advancing element no matter which of the methods or apparatus described is employed. Furthermore, the regularity of the lay of the cable depends upon the constancy of this ratio and not upon the absolute values of the two speeds. Because of the forces and stresses involved, cabling machines are large and massive, especially as to the principal rotating elements. The control of the speeds of these elements and the maintenance of their constant ratio, especially during acceleration and deceleration, the maintenance of tension in the strands and cables during periods of stoppage, the proper synchronization of auxiliary devices, e. g. means to serve a binding strand about the intertwisted conductor strands, and the like functions, present difficult problems because of the masses, inertial forces and need for accuracy of control involved. The same problem arises in other kinds of multiple unit apparatus, where cooperating but otherwise independent elements must be kept carefully controlled in motion relative to each other.

An object of the present invention is to provide, in multiple unit apparatus and particularly in cabling machines, an efficient, reliable and sensitive system of driving and control means effective substantially automatically to maintain the geometric interrelations of strands being operated on by the apparatus substantially constant under all conditions of operation of the apparatus, whether at rest, in acceleration, in full operation, or in deceleration.

With the above and other objects in view, the invention, in a cabling machine having a plurality of independently powered cooperating units, e. g. a motor driven flier and a motor driven take-up reel, may be embodied in means to actuate and control the several power means and comprising means to drive one unit, an electric motor driving another unit, a vacuum power tube to supply power to the said motor, a phase shifting device to control the output of the vacuum tube, and a differential device driven by the two units and in turn driving the phase shifting device to modify the speed of the motor.

Other objects and features of the invention will appear from the following detailed description of one embodiment thereof taken in connection with the accompanying drawings, in which the same reference numerals are applied to identical parts in the several figures, and in which Fig. 1 is a diagrammatic representation of the electrical devices and circuits comprised in the driving and control means, constructed in accordance with the invention, of a machine having a plurality of motor driven, cooperating units; and Fig. 2 is a diagrammatic representation of a cabling machine to which may be applied the control system illustrated in Fig. 1.

The apparatus disclosed in Fig. 1 as an illustrative embodiment is the driving and control system for a cabling machine. The relevant mechanical features of one suitable type of such machine are shown in Fig. 1 in order to illustrate the mechanical and functional relations of the several motors and other mechanical elements necessary to the showing of Fig. 1. For further description of this particular type of machine reference may be had, if desired, to U. S. Patents 1,956,730 of May 1, 1934 and 2,171,993 of September 5, 1939 both to the present inventor. For present purposes it is sufficient to note that the primary power means of such a machine are motor means to drive a flier rotating about a take-up means as in Fig. 4 of the same patent, and motor means to drive a take-up. As adjuncts there may also be devices such as the booster driven by the motor 9, and the serving head driven by the motor 10. Thus, for illustration of the invention, let there be assumed a machine, as shown in Fig. 2, having a main driving motor to drive a flier, related auxiliary motors to drive a booster and a serving head, and a wholly independent motor to drive a take-up. The Fig. 1 of the drawing herein discloses diagrammatically and in detail the network of circuits which supplies power to and effectuates the necessary control of these units of the machine.

The machine control comprises an arrangement in which the speed of the main driving motor and related auxiliary motors is controlled by varying the field of a constant speed separately excited D. C. generator by which these motors are driven. In combination with the machine control a separately excited D. C. shunt motor drives the take-up truck by a means hereinafter explained wherein the take-up truck speed is held in proper relation to that of the cable and machine to hold the lay constant. The drive system consists of a D. C. shunt generator 1 driven by a constant speed motor 2. The field 3 of the generator 1 is separately excited from D. C. mains 300 and 301 and its voltage output is controlled by the resistor bank 4 of a motor operated rheostat 5 in series with the field 3 across the D. C. outside supply mains 300 and 301. The armature of the generator 1 is in parallel arrangement through lines 400, 401 and 402 and the contact 6 of a solenoid operated switch 7 and further through lines 405 and 404 and a contact 41 of a switch 42 with a flier drive motor 8, a booster motor 9 and a serving head motor 10. The motors 8, 9 and 10, which are of the D. C. shunt type, are separately excited through fields 11, 12 and 13 from D. C. mains 300 and 301. As the voltage delivered by generator 1 is a function of the amount of excitation in the generator field 3, the speed of the motors 8, 9 and 10 is also a function of the voltage present across field 3 as controlled by the resistor bank 4 of the rheostat 5. Motors 9 and 10 have variable resistors 14 and 15 in series with their respective fields 12 and 13 to give additional speed variation above the maximum made possible by the regulation of the generator field 3.

The take-up unit which is the means of advancing the cable through the machine is driven by a separately excited D. C. shunt motor 16. The field 17 of the motor 16 is connected to the D. C. mains 300 and 301. The armature of the motor 16 is connected to and receives its power from the filament sides 18, 19 and 20 of rectifier tubes 21, 22 and 23 and the neutral of a three-phase A. C. transformer 24 through lines 521, 522, 523, 520 and 524. The transformer 24 is connected to suitable three-phase A. C. mains 500, 501 and 502 and delivers A. C. power through the lines 506, 507 and 508, contacts 38, 39 and 40 of a magnetic switch 37 and lines 509, 510 and 511 to the plates 25, 26 and 27 of the tubes 21, 22 and 23, where it is changed to D. C. power and delivered through the lines 521, 522, 523 and 524 to the motor 16.

A means is provided for maintaining the speed of the take-up unit in proper relation to the speed of the revolving flier to maintain the cable speed constant. This is accomplished by means of a wheel 28 riding on the cable 128 being made in the machine driving one member of a differential 29. A second member of the differential 29 is driven at constant speed by the revolving flier through a shaft 43 and the third member drives a shaft 30 to change the speed of the take-up motor 16. Operation of this differential is explained in full detail in Patent No. 2,171,993.

Rotation of the differential shaft 30 causes rotation of the rotor 31 of a conventional three-phase device 32, excited from the transformer 24 through lines 503, 504 and 555, to induce an out-of-phase voltage in the stator 33 which is transmitted through lines 525, 526 and 527 to the grids 34, 35 and 36 of the tubes 21, 22 and 23. Therefore, when differential system 29 calls for a speed change of the take-up truck motor 16, the shaft 30 changes the position of the rotor 31 to induce a voltage of proper phase in the stator 33 and bias the tube grids as previously explained to vary the output voltage of the tubes 21, 22 and 23. The contacts 38, 39 and 40 of the magnetic switch 37, interposed in lines 506, 507 and 508 and 509, 510 and 511, respectively, connect and disconnect the take-up motor 16 from its electrical source 24, as called for by the master control. Disconnection of this control through deenergization of switch 37 would normally allow free rotation of the core unit in a direction opposite to the advancement direction of the cable due to the back pull of the tension from the wire supplies. To overcome this pull back or backlash a pawl 65 is provided to catch in a ratchet wheel 83 connected to the drive shaft 183 of the take-up drive motor 16. For practical reasons the pawl must be disengaged from the ratchet wheel while the machine is operating above jogging speed and loading and unloading the core unit into the strander. A solenoid 44 is provided for this purpose, receiving its energization through A. C. lines 501, 532, bars 45 and 46 of the rheostat 5 and a slidable contact 47 connecting bars 45 and 46 on the rheostat 5, the function of which will be hereinafter described, and thence through line 528 to line 500. A separate switch 48, through a contact 49, also allows of independent energization of the solenoid 44.

Means is also provided for holding the machine at rest by a conventional brake (not shown) acting on the shaft of the flier drive motor 8 and actuated by a solenoid 51.

The control further comprises a starting switch 52, having instantaneous closing contacts 53 and 54, a delayed closing contact 55 and a delayed opening contact 104, said switch being controlled by a push button station 58 consisting of a start 57 and stop 56 portions, and the maintaining contact 50 of the switch 48. A jogging switch 59 having two contacts 60 and 61, is controlled by a push button station 62. There are also a brake release switch 63 having a closing contact 64; a stopping switch 66 having instantaneous closing but delayed opening contacts 67 and 68; a take-up holding switch 69 having an instantaneous closing but delayed opening contact 70; a load-run switch 42 having closing contacts 41, 71, 72 and 73 controlled by a push button station 74 having make and break buttons 75 and 76. The complex switch and rheostat 5 is operated by a motor 77 with two electrical fields 781 and 79 so connected that their individual separate excitation allows motor operation in either direction. The motor 77 drives through a shaft 92 and bevel gears 80, a shaft 81 having a screw thread cut therein. A crossbar 82 engages the threaded shaft 81 so that revolution of shaft 81 causes travel of the bar 82. The bar 82 has mounted therein brushes 84, 85, 86, 87, 88 and 89 connected in pairs by wires 47, 90 and 91 respectively. Wire 47 through brushes 84 and 85 connects the bars 45 and 46; wire 90 through brushes 86 and 87 connects the bar 94 and the variable resistor 4 and the wire 91 connects the bars 95 and 96, and also the bars 97 and 98 when the rheostat is in one extreme position. Limit switches 93 and 99, designated as upper and lower respectively, are operated by projections 100 and 101 on the bar 82.

The above described complex of devices must function together as hereinafter explained to accomplish the following.

The machine when starting must run at a very slow speed for several revolutions until the take-up unit gets started without uneven operation; the machine must then accelerate uniformly until maximum machine operating speed is reached, where it must operate at constant speed. In stopping the machine must decelerate uniformly to a point of very slow speed, which speed must be maintained for several revolutions to allow the machine inertia effect to catch up with the regenerative braking brought into action in the now driven motors and then the machine must stop and several seconds later the take-up tension be released. A further necessity is that while the machine is being loaded, the running circuit shall be inoperative and the booster, serving head and take-up motors disconnected from their supply sources.

This is accomplished as follows. Five conditions of machine operation will be described, starting, running, stopping, jogging and loading.

To operate the machine it is assumed that power has been applied to the motor 2 and it is operating the generator 1 at the required speed and that lines 300, 301, 500, 501 and 502 are energized also. Further, it is assumed that the control is in a normal start position, that is switch 42 has been closed by the operation of the button 75 which completes an electrical circuit from line 301, through line 303, button 76, line 304, button 75, line 305, the coil of 42 and line 306 to line 300. This operation closes contacts 71, 72, 41 and 73 and the coil of switch 42 is maintained energized after the breaking of button 75 by the release of finger pressure, by a circuit from line 301, through line 303, button 76, line 307, contact 73, line 308, coil of 42, line 306 to line 300. The bar 82 of the motor operated rheostat 5 is then in its normally off position spanning bars 97, 98 and 94, resistance 4, bars 102 and 103. Also, the button 50 of the switch 48 is closed.

Starting is then accomplished by momentarily closing the start button 57 which completes an electrical circuit from the line 300, through the line 309, the closed buton switch 50 of the switch 48, the line 310, the coil of switch 52, line 311, the closed contact 71 of the switch 42, line 312, button 57 of the station 58, line 313, the normally closed buton 56 also of the station 58 and the line 314 to the line 301. Thus switch 52 is closed, immediately closing contacts 53 and 54. Contact 54 establishes a holding circuit for the switch 52, after button 57 is released by completing a circuit from button 58 through line 315, contact 54, and line 316 to line 312 and thence to line 300 as hereinafter enumerated. The closing of contact 53 completes a circuit from line 315 through contact 53, line 317, line 318, the coil of switch 59, lines 319 and 320 to line 300 to close the switch 59, thereby closing contacts 60 and 61. Closing of the contact 60 causes a circuit to be completed from the line 300, through line 320, contact 60, line 321, line 322, the coil of switch 7, line 323, and line 324 to line 301, and also from line 322 through line 325, the coil of switch 63 and line 324 to line 301. Closing the contact 61 completes an electrical circuit from line 500 through line 528, line 529, the previously closed contact 72 of the switch 42, line 530, contact 61, line 531, the coil of switch 37 and line 532 to line 501. The effect, therefore, of closing contacts 61 and 62 is to energize and close the switches 63, 7 and 37. The closing of the switch 63 closes a contact 64 to complete an electrical circuit from the line 300, line 326, the releasing solenoid 51 of the brake, the line 327, the contact 64, the line 328 to line 301. This releases the brake from the main drive motor 8 and coincidentally motors 8, 9 and 10 are connected electrically through the closing of the switch 7 and the take-up motor 16 is connected electrically to its source of energy through the closing of switch 37 as hereinbefore explained. Thus the machine starts operation and runs at a slow speed because of the resistance 4 of the rheostat 5 connected in series with the field 3 of the generator 1, this circuit being established from line 300, through line 329, resistance 4, brush 86, connector 90, brush 87, bar 94, line 330, field 3 of the generator 1, and line 331 to line 301, is at a decreasing maximum.

Returning now to the operation of switch 52, as previously stated contacts 53 and 54 close instantly, but contacts 55 and 104 are so arranged that they are delayed, say five seconds for purposes of demonstration, in closing and opening respectively. Therefore the machine runs at very slow speed for five seconds until the contact 55 closes. On the closing of this contact 55 a circuit is completed from the line 300, through line 332, the armature of the series motor 77 and its field 79, line 333, contact 55, line 334, limit switch 93 of the rheostat which is closed under the condition being described, line 335 and line 331 to the line 301. The establishment of this circuit causes operation of the motor 77 as hereinbefore described to turn the screw shaft 81 which causes the nut 83 and the bar 82 of which it is a part to move away from its original position. This motion of the bar 82 continues until it arrives at the other extreme or normal maximum machine speed position when the projection 101 on the bar 82 opens the limit switch 79 and operation of the motor discontinues. As the bar is moving uniformly, the portion of the resistance 4 in series with the generator field 3 becomes uniformly less and less until full field strength is present in the field 3 of the generator 1. This causes full voltage output of the generator to be impressed on the motors 8, 9 and 10, and the maximum continuous operating speed of the machine is obtained and maintained until it is desirable to stop the machine.

Coincident with the described movement of the bar 82, connections across 97 and 98 and 102 and 103 are broken and connections are made across 95 and 96 and 45 and 46 respectively. The connection 95 and 96 completes an electric circuit from line 300 through line 336, the coil of the switch 66, line 337, brush 89, connection 91, brush 88, line 338, line 335, and line 331 to line 301 to operate the switch 66 and thereby close its contacts 67 and 68. The contact 67 completes an electric circuit from the line 300 through line 336, contact 67, line 339, the coil of a switch 69, line 340, line 324 to line 301 to operate the switch 69 and close the contact 70.

The closing of the contact 68 of the switch 66 establishes a parallel arrangement with the contact 60 of the switch 59, completing a secondary circuit from line 300, through line 336, the closed contact 68, and line 322 through the coils of switches 7 and 63 to line 301 as hereinbefore explained. The closing of the contact 70 of the switch 69 establishes a parallel arrangement with the contact 61 of the switch 59, to complete a secondary circuit from the line 500, through line 528, line 529, line 537, the closed contact 70, line 536, line 531, the coil of switch 37, and line 532 to line 501. The switches 66 and 69 are of the delayed opening type and establish holding-in circuits for the switches 7 and 63 and 37 respectively, the definite functions of which are hereinafter explained.

Returning now to the connection across the bars 45 and 46 which establish a circuit from line 500, through line 528, the coil of the solenoid 44, line 533, bar 46, brush 85, connection 47, brush 84, bar 45, and line 532 to line 501. This energizes the solenoid 44 to release the pawl 65 on the take-up unit drive shaft which is desirable during operation of the machine as hereinafter explained.

Now assume that the machine is operating at normal maximum speed and it is desired to stop the machine. This is accomplished by momentarily closing the stop button 56 of the station 58. The circuit through the switch 52 is interrupted through the circuit path hereinbefore enumerated, and contacts 53, 54 and 55 are opened and contact 104 is closed. The opening of contact 54 interrupts the circuit of the coil of switch 59 through a path hereinbefore enumerated and contacts 60 and 61 are opened which would tend to interrupt the circuits to switches 7, 63 and 37 were it not for the parallel holding-in arrangements through switches 66 and 69 as hereinbefore explained. Coincident with these operations the closing of the contact 104 of the switch 52 causes a circuit to be completed from line 300 through line 312, the armature of the motor 77 of the rheostat 5, the motor field 78, line 341, the upward travel of the bar 82, and line 331 to line 301. This causes operation of the motor 77 to turn the screw 81 in a direction to advance the bar in the reverse direction to that of its former motion. This action causes an increasing amount of the resistance 4 to be connected in series with the field 3 of the generator 1 with a coincident reduction in generator output voltage to effect deceleration of the motors 8, 9 and 10 by regenerative means. Deceleration of the take-up motor is also accomplished by reduction of its input voltage by the action of the differential 29, depending on the moving cable and the machine deceleration.

Coincidental with and essential to the regenerative braking as the bar 82 moves downward is the maintenance of the holding circuits on the switches 7, 63 and 37 by the switches 66 and 69 through the bars 95 and 96 of the motor operated rheostat 5 as hereinafter explained. Therethrough the motors 8, 9 and 10 are held in connection with the generator 1 until the bar 82 is in its extreme position across the bars 102, 103, 97 and 98. At this point the limit switch 99 is opened by the projection 100 on the bar 82 and the motor circuit is interrupted and the motion of the bar 82 stops.

Because the revolving parts of the machine have considerable inertia and the slowing down of these parts lags behind the speed corresponding to the voltage output of generator, immediately stopping the machine when the bar 82 reaches its extreme point by applying the brake 51 and disconnecting the motors 8, 9 and 10 would cause a bad jar and an undesirable overrunning of the take-up motor 16. Therefore, switches 66 and 69 are of the delayed action type so that when the bar 82 passes off the bars 95 and 96 of the rheostat 5, the circuit to switch 66 is broken but because the contacts 67 and 68 are delayed opening the machine runs for say three or four seconds at very slow speed, which allows the inertia effect of slowing down to dissipate itself and when contact 68 opens, the circuits of switches 7 and 63 are broken, opening contacts 6 and 64 to disconnect the motors 8, 9 and 10 from the generator 1 and set the motor brake through the solenoid 51. The opening of the contact 67 of the switch 66 interrupts the circuit through the switch 69 which after a time delay of, say one second, allows contact 70 to open and take the take-up motor 16 off the line through the interruption of the circuit to the switch 37. Thus the take-up tension in the cable being made is maintained for a few seconds after the machine is stopped. From this point on stalled tension in the cable being made is maintained by the pawl 65 on the core unit motor shaft, this pawl having been brought into operation by release of the solenoid 44 by the bar 82 breaking off the bars 45 and 46 when the bar 82 reaches its extreme or off position.

When take-up reels are being removed from the machine a release of the pawl 65 is desirable and is effected by the closing of the button 49 of the station 48, which, through lines 534 and 535, is in parallel arrangement on lines 512 and 532 with the bars 45 and 46, of the rheostat 5. The station 48 is of the maintaining type and coincident with the depression of the button 49 the circuit through the button 50 is broken so that operation of the machine is interrupted by the opening of lines 309 and 310.

It is desirable at times to operate the machine at a jogging or an inching speed. This speed is obtained with the full resistance 4 of the rheostat 5 in series with the field 3 of the generator 1 and the bar 82 of the rheostat 5 in its off position. This is accomplished by depressing and holding down the jog button 62 which completes a circuit from line 300, through line 320, line 319, the coil of switch 59, line 318, bar 98, brush 84, connection 91, brush 88, bar 97 of the rheostat 5, line 343, button 62, and line 344 to line 301. This causes the operation of the switch 59 to close its contacts 60 and 61, to close switches 7, 63 and 37, which allows the machine to operate at slow speed as hereinbefore explained. Releasing the button 62 breaks the circuit to switch 59 and the machine stops. Jogging is prevented when the machine is operating at any speed above this slow speed because the bar 82 of the rheostat 5 in moving upward breaks the jog circuit by passing off the bars 97 and 98.

Assume now that the supply of the machine is to be loaded. Under this condition the main motor must remain connected, but the motors 9, 10 and 16 and the circuit to the starting switch 59 must be disconnected. A load-run switch 42 is provided which is controlled by the station 74. Depressing the button 76 of the station 74 interrupts the circuit to the switch 42 to open its contacts 71, 72, 41 and 73 to affect these functions through circuit paths hereinbefore explained. On completion of the loading operation the momentary depression of the button 75 of the station 74 resets the switch for running operation of the machine through the closing of its contacts 71, 72, 41 and 73.

Reduced to its lowest terms, the invention would comprise the motor 8 driven at constant speed, the motor 16 driven by the tubes 21, 22 and 23, the phase shifter 32 controlling the output of the tubes, and the differential 29 driven at one side by the motor 8 (through mechanical means not shown) and at the other side by the motor 16 (through the cable drawn along by this motor driving the take-up) and in turn driving the device 32 to modify the output of the tubes and hence the speed of the motor 16 as required to keep the two motor speeds in constant relation to each other.

Generalizing this somewhat, the single motor 8 may become a plurality of motors, as in the particular illustration described (8, 9 and 10), interrelated (by their common power source 1) to run synchronously; and also the power lines 520 and 524 fed by the tubes could feed more than one motor 16, in series, in parallel, or in multiple, which motors then would form a second plurality of interrelated motors. Thus in any apparatus or machine having at least two groups of motors, interrelated mutually in each group but independent of each other as groups, control of the groups relatively to each other may be had by supplying power to at least one group through vacuum tubes, controlling the output of these tubes by a suitable adjustable electrical device such as the phase shifter 32, and providing a differential device driven by the two groups of motors and connected to drive the adjustment of the tube output control device.

Since, in the case of the particular kind of machine used to illustrate the invention, and for which the invention is particularly advantageous, namely a cabling machine, the maintenance of tension in the cable during acceleration and deceleration and during periods of stoppage is important to the satisfactory operation of the wheel 28 and hence of the differential and thus of the invention in this case, it is thought that there is ancillary invention in the provision of the pawl 65 as means to prevent backlash in the motor 16. There will be other embodiments of the main invention, of course, in which such means are not required; but it is believed proper to include herein claims to this feature as an invention ancillary to the principal invention.

What is claimed is:

1. In a cabling machine having a rotatable strand twisting member and a rotatable strand advancing member to intertwist a plurality of strands into a cable by the cooperative action of the two members, means to rotate the strand twisting member, an electric motor to rotate the strand advancing member, a vacuum power tube to supply current to the motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with means to hold the strand advancing member against reverse rotation during periods of stoppage and thereby maintain in the cable being made the tension necessary to keep the vacuum tube output modifying means accurately effective during acceleration and deceleration of the machine.

2. In a cabling machine having a rotatable strand twisting member and a rotatable strand advancing member to intertwist a plurality of strands into a cable by the cooperative action of the two members, means to rotate the strand twisting member, an electric motor to rotate the strand advancing member, a vacuum power tube to supply current to the motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with a ratchet wheel on the strand advancing member and a pawl to coact therewith to hold the strand advancing member against reverse rotation during periods of stoppage and thereby maintain in the cable being made the tension necessary to keep the vacuum tube output modifying means accurately effective during acceleration and deceleration of the machine.

3. In a cabling machine having a rotatable strand twisting member and a rotatable strand advancing member to intertwist a plurality of strands into a cable by the cooperative action of the two members, an electric motor to rotate the strand twisting member, an electric motor to rotate the strand advancing member, a vacuum power tube to supply current to the second named motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with means to apply full power at once from the vacuum tube to the second named motor and to supply gradually increasing power to the first named motor while the machine is being started.

4. In a cabling machine having a rotatable strand twisting member and a rotatable strand advancing member to intertwist a plurality of strands into a cable by the cooperative action of the two members, an electric motor to rotate the strand twisting member, an electric motor to rotate the strand advancing member, a vacuum power tube to supply current to the second named motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with means to apply full power at once from the vacuum tube to the second named motor and to supply gradually increasing power to the first named motor while the machine is being started and to supply gradually decreasing power to the first named motor while continuing to apply full power from the vacuum tube to the second named motor while the machine is being stopped.

5. In a cabling machine having a rotatable strand twisting member and a rotatable strand advancing member to intertwist a plurality of strands into a cable by the cooperative action of the two members, an electric motor to rotate the strand twisting member, an electric motor to rotate the strand advancing member, a vacuum power tube to supply current to the second named motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with means to apply full power at once from the vacuum tube to the second named motor and to supply gradually increasing power to the first named motor while the machine is being started and to supply gradually decreasing power to the first named motor while continuing to apply full power from the vacuum tube to the second named motor while the machine is being stopped and means to hold the strand advancing member against reverse rotation during periods of stoppage and thereby maintain in the cable being made the tension necessary to keep the vacuum tube output modifying means accurately effective during acceleration and deceleration of the machine.

6. In a cabling machine having a rotatable strand twisting member and a rotatable strand advancing member to intertwist a plurality of strands into a cable by the cooperative action of the two members, an electric motor to rotate the strand twisting member, an electric motor to rotate the strand advancing member, a vacuum power tube to supply current to the second named motor to drive the same, and means driven by the strand twisting member and by the cable being formed in the machine and effective to modify the output of the vacuum tube to the motor in accordance with variations in the ratio of the speed of the rotating strand twisting member to the longitudinal speed of advance of the cable, in combination with means to apply full power at once from the vacuum tube to the second named motor and to supply gradually increasing power to the first named motor while the machine is being started and to supply gradually decreasing power to the first named motor while continuing to apply full power from the vacuum tube to the second named motor while the machine is being stopped and a ratchet wheel on the strand advancing member and a pawl to coact therewith to hold the strand advancing member against reverse rotation during periods of stoppage and thereby maintain in the cable being made the tension necessary to keep the vacuum tube output modifying means accurately effective during acceleration and deceleration of the machine.

LESTER O. REICHELT.